(12) United States Patent
Dandoko et al.

(10) Patent No.: US 9,843,700 B2
(45) Date of Patent: Dec. 12, 2017

(54) IMAGE FORMING APPARATUS AND METHOD FOR CONTROLLING IMAGE FORMING APPARATUS

(71) Applicant: KYOCERA Document Solutions Inc., Osaka (JP)

(72) Inventors: Takushi Dandoko, Osaka (JP); Tetsuya Maeda, Osaka (JP)

(73) Assignee: KYOCERA Documents Solutions Inc., Osaka (JP)

( * ) Notice: Subject to any disclaimer, the term of this patent is extended or adjusted under 35 U.S.C. 154(b) by 0 days.

(21) Appl. No.: 15/247,405

(22) Filed: Aug. 25, 2016

(65) Prior Publication Data

US 2017/0070637 A1    Mar. 9, 2017

(30) Foreign Application Priority Data

Sep. 8, 2015 (JP) .................................. 2015-176803

(51) Int. Cl.
*G06F 15/00* (2006.01)
*H04N 1/32* (2006.01)
*H04N 1/00* (2006.01)

(52) U.S. Cl.
CPC ....... *H04N 1/3263* (2013.01); *H04N 1/00037* (2013.01); *H04N 1/00058* (2013.01); *H04N 1/00076* (2013.01); *H04N 1/00082* (2013.01); *H04N 1/00687* (2013.01); *H04N 1/00925* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2015/0202899 A1* | 7/2015 | Nihashi | B41J 11/663 347/220 |
| 2016/0001993 A1* | 1/2016 | Brown | B65H 1/26 271/162 |
| 2016/0162765 A1* | 6/2016 | Konuma | H04N 1/00411 358/1.15 |
| 2016/0378414 A1* | 12/2016 | Oya | G06F 3/121 358/1.15 |

FOREIGN PATENT DOCUMENTS

JP        2002-278377 A      9/2002

* cited by examiner

*Primary Examiner* — Helen Q Zong
(74) *Attorney, Agent, or Firm* — Stein IP, LLC

(57) ABSTRACT

An image forming apparatus detects that the paper sheet cassette has been drawn out and that the paper sheet cassette has been housed, and upon detecting either that the paper sheet cassette has been drawn out or that the paper sheet cassette has been housed, detects that a reference operation has been performed. When the reference operation has been performed in a time period other than while a printing job is being executed, the control portion performs control so that the screen related to paper sheet setting is displayed, and when the reference operation has been performed while the printing job is being executed, the control portion performs control so that the screen related to paper sheet setting is not displayed.

7 Claims, 10 Drawing Sheets

IMAGE FORMING APPARATUS AND METHOD FOR CONTROLLING IMAGE FORMING APPARATUS

INCORPORATION BY REFERENCE

This application is based upon and claims the benefit of priority from the corresponding Japanese Patent Application No. 2015-176803 filed on Sep. 8, 2015, the entire contents of which are incorporated herein by reference.

BACKGROUND

The present disclosure relates to an image forming apparatus having a paper sheet cassette and a method for controlling an image forming apparatus.

As an image forming apparatus having a paper sheet cassette, there is a type that accepts, from a user, setting of a size, a type, or the like of a paper sheet loaded in the paper sheet cassette and stores the setting as paper sheet information. For example, in executing a printing job, such an image forming apparatus checks a piece of paper sheet information (a paper sheet size, type, or the like) corresponding to the paper sheet cassette as a paper feed source and executes the printing job under a printing condition suitable for a paper sheet indicated by the piece of paper sheet information.

For example, in a case where a paper sheet actually loaded in the paper sheet cassette as the paper feed source is different from a paper sheet indicated by a piece of paper sheet information corresponding to the paper sheet cassette as the paper feed source (for example, a case where a sheet of regular paper is actually loaded, whereas a paper sheet indicated by the piece of paper sheet information is set to be a sheet of cardboard), there occurs an inconvenience such as a decrease in image quality of an outputted image. For this reason, every time paper sheet replacement work of replacing a batch of paper sheets currently loaded in the paper sheet cassette with another batch of paper sheets (a batch of paper sheets different in size and/or type therefrom) is done, it is required that a corresponding piece of paper sheet information be changed accordingly.

To this end, there is a conventional image forming apparatus of a type that, when a paper sheet cassette has been housed therein (when there is a possibility that paper sheet replacement work has been performed), displays a setting screen for accordingly changing a piece of paper sheet information corresponding to said paper sheet cassette. With the conventional image forming apparatus of this type, a user who has performed the paper sheet replacement work can be prompted to change accordingly the piece of paper sheet information.

SUMMARY

An image forming apparatus according to a first aspect of the present disclosure has a control portion, a printing portion, a paper sheet cassette, a cassette sensor, and an operation display portion. The control portion is formed of a CPU. The printing portion prints an image on a paper sheet. The paper sheet cassette is housed in the image forming apparatus and, in a case of loading a paper sheet therein, is drawn out from the image forming apparatus. The cassette sensor has an output varying depending on whether or not the paper sheet cassette has been drawn out from the image forming apparatus. The operation display portion displays a screen related to paper sheet setting with respect to the paper sheet cassette and accepts an operation. Based on an output of the cassette sensor, the control portion detects that the paper sheet cassette has been drawn out from the image forming apparatus and that the paper sheet cassette has been housed in the image forming apparatus, and upon detecting either that the paper sheet cassette has been drawn out from the image forming apparatus or that the paper sheet cassette has been housed in the image forming apparatus, detects that a reference operation for judging whether or not to display the screen related to paper sheet setting has been performed. When the reference operation has been performed in a time period other than while a printing job involving printing by the printing portion is being executed, the control portion controls the operation display portion to display the screen related to paper sheet setting, and when the reference operation has been performed while the printing job is being executed, the control portion controls the operation display portion not to display the screen related to paper sheet setting.

A method for controlling an image forming apparatus according to a second aspect of the present disclosure has steps of detecting that a paper sheet cassette, which is housed in the image forming apparatus and, in a case of loading a paper sheet therein, is drawn out from the image forming apparatus, has been drawn out from the image forming apparatus and that the paper sheet cassette has been housed in the image forming apparatus, upon detecting either that the paper sheet cassette has been drawn out from the image forming apparatus or that the paper sheet cassette has been housed in the image forming apparatus, detecting that a reference operation for judging whether or not to display a screen related to paper sheet setting with respect to the paper sheet cassette has been performed, when the reference operation has been performed while a printing job is being executed, not displaying the screen related to paper sheet setting, and when the reference operation has been performed in a time period other than while the printing job is being executed, displaying the screen related to paper sheet setting.

DETAILED DESCRIPTION

By using, as an example, a multi-functional peripheral that is capable of executing a plurality of types of jobs such as a copy job, a printer job, and a transmission job (for example, a fax job), the following describes an image forming apparatus of this embodiment. In the following description, the copy job and the printer job (jobs involving printing) may be referred to collectively as a printing job.
<Entire Configuration of Image Forming Apparatus>

Figure 1:
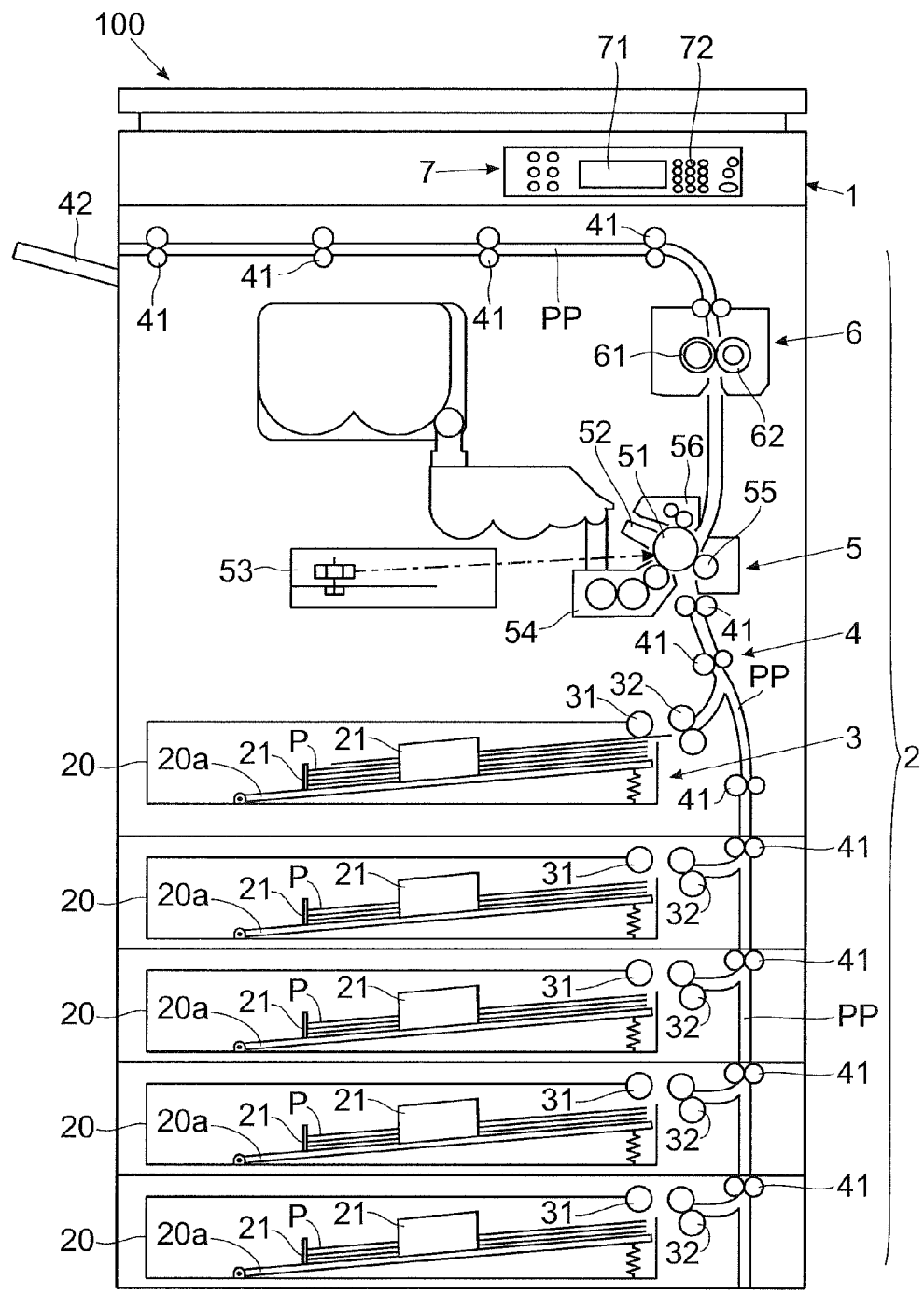
FIG. 1 is a diagram showing an entire configuration of an image forming apparatus according to one embodiment of the present disclosure.

As shown in FIG. 1, an image forming apparatus 100 of this embodiment has an image reading portion 1 and a printing portion 2. The image reading portion 1 reads an original document and generates image data based thereon. In jobs involving reading of an original document (a copy job and a transmission job), the reading of an original document is performed by the image reading portion 1.

While conveying a paper sheet P along a paper sheet conveyance path PP, based on image data (for example, image data obtained through reading of an original document by the image reading portion 1), the printing portion 2 forms a toner image. Then, the printing portion 2 prints (transfers) the toner image on the paper sheet P being conveyed. In jobs involving printing (a copy job and a printer job), printing of an image on the paper sheet P is performed by the printing portion 2. The printing portion 2 is composed of a paper feed portion 3, a paper sheet conveyance portion 4, an image forming portion 5, and a fixing portion 6.

The paper feed portion 3 includes a pick-up roller 31 and a paper feed roller pair 32. The pick-up roller 31 feeds out the paper sheet P loaded in a paper sheet cassette 20 to a nip between the paper feed roller pair 32. The paper feed roller pair 32 supplies the paper sheet P that has arrived at the nip to the paper sheet conveyance path PP.

In the paper sheet cassette 20, a regulation guide 21 is provided that performs positioning of the paper sheet P by coming in contact with a side of the paper sheet P. The regulation guide 21 is designed to be slidable and is made to slide to change a loadable paper sheet size in the paper sheet cassette 20. The regulation guide 21 includes, for example, a cursor for performing positioning of the paper sheet P in a width direction thereof (a direction orthogonal to a conveyance direction) and a rear end stopper for performing positioning of a rear end of the paper sheet P.

Furthermore, in the paper sheet cassette 20, a placing plate 20a is provided on which the paper sheet P is placed. The placing plate 20a is designed to be turnable about one end thereof as a fulcrum, and when the paper sheets P are placed thereon, its inclination varies depending on the number of the paper sheets P. To be specific, as the number of paper sheets on the placing plate 20a (a remaining paper sheet quantity of the paper sheet cassette 20) increases, the other end of the placing plate 20a on an opposite side to the one end (turning fulcrum) thereof turns downward (an inclination angle of the placing plate 20a decreases). On the other hand, as the number of paper sheets on the placing plate 20a decreases, the other end of the placing plate 20a turns upward (the inclination angle of the placing plate 20a increases).

Here, the image forming apparatus 100 has a plurality of the paper sheet cassettes 20. The plurality of the paper sheet cassettes 20 are each housed in the image forming apparatus 100. Furthermore, the plurality of the paper sheet cassettes 20 are each designed to be able to be drawn out from inside the image forming apparatus 100. When a user performs work of newly loading a batch of the paper sheets P in any one of the plurality of the paper sheet cassettes 20 or work of replacing a batch of the paper sheets P currently loaded therein with another batch of the paper sheets P, the any one of the paper sheet cassettes 20 as a subject of such work is drawn out from inside the apparatus. Then, with respect to the any one of the paper sheet cassettes 20 which has been drawn out from inside the apparatus, the batch of the paper sheets P is newly loaded therein or the batch of the paper sheets P loaded therein is replaced. After that, the any one of the paper sheet cassettes 20 which has been drawn out from inside the apparatus is housed again in the apparatus. While FIG. 1 shows, as one example, the image forming apparatus 100 in which five paper sheet cassettes 20 are housed, there is no particular limitation on the number of the paper sheet cassettes 20.

The paper sheet conveyance portion 4 includes a plurality of conveyance roller pairs 41 and conveys the paper sheet P along the paper sheet conveyance path PP. Then, the paper sheet conveyance portion 4 eventually ejects the paper sheet P (the paper sheet P that has been printed) onto an ejection tray 42.

The image forming portion 5 includes a photosensitive drum 51, a charging device 52, an exposure device 53, a developing device 54, a transfer roller 55, and a cleaning device 56. Further, based on image data, the image forming portion 5 forms a toner image and transfers the toner image on the paper sheet P.

The fixing portion 6 includes a heating roller 61 and a pressing roller 62. The heating roller 61 includes a built-in heater. The pressing roller 62 is in press contact with the heating roller 61 to form a fixing nip between itself and the heating roller 61. Further, the fixing portion 6 heats and presses the paper sheet P that has entered the fixing nip so as to fix the toner image that has been transferred on the paper sheet P.

Furthermore, the image forming apparatus 100 has an operation panel 7. The operation panel 7 includes a touch panel display 71. The touch panel display 71 displays soft keys, messages, and so on and accepts, from a user, various types of setting related to the image forming apparatus 100. Furthermore, on the operation panel 7, hard keys 72 such as a start key and a numeric keypad also are provided. The operation panel 7 corresponds to a "operation display portion".

<Hardware Configuration of Image Forming Apparatus>

Figure 2:
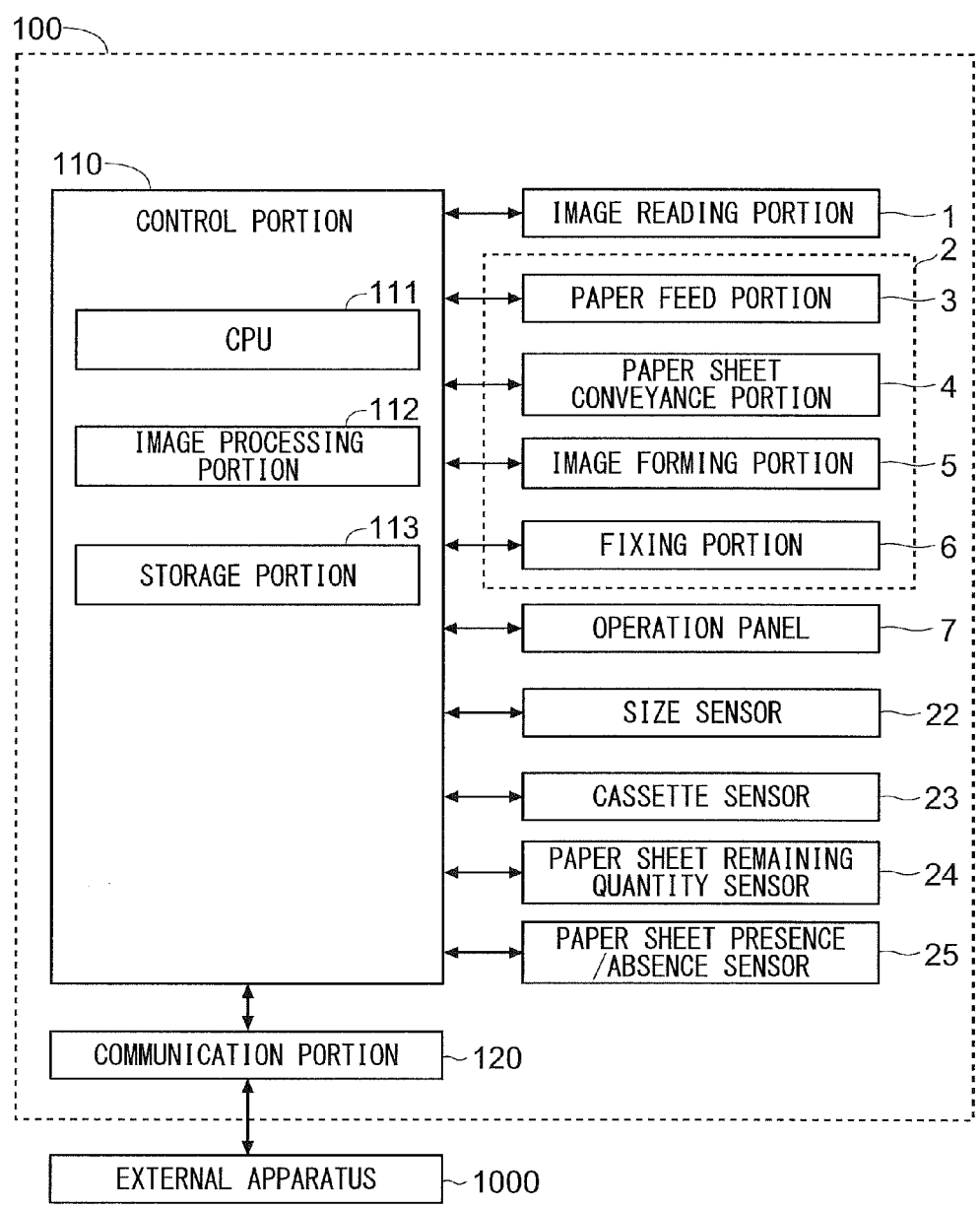
FIG. 2 is a diagram showing a hardware configuration of the image forming apparatus according to the one embodiment of the present disclosure.

As shown in FIG. 2, the image forming apparatus 100 has a control portion 110. The control portion 110 includes a CPU 111, an image processing portion 112, and a storage portion 113. The image processing portion 112 is formed of, for example, an ASIC dedicated to image processing and subjects image data to various types of image processing (enlargement/reduction, concentration conversion, data format conversion, and so on). The storage portion 113 is composed of a ROM, a RAM, an HDD, and so on. In the storage portion 113, control programs and data are stored. Further, based on the control programs and data stored in the storage portion 113, the control portion 110 controls operations of the various portions in the image forming apparatus 100.

To be specific, the control portion 110 is connected to the image reading portion 1 and the printing portion 2 to control a reading operation of the image reading portion 1 and a printing operation of the printing portion 2, respectively. Furthermore, the control portion 110 is connected to the operation panel 7 to control a display operation of the operation panel 7 and to detect an operation performed with respect to the operation panel 7.

Furthermore, the image forming apparatus 100 has a communication portion 120. The communication portion 120 is communicably connected to an external apparatus 1000. For example, the external apparatus 1000 is a user terminal (personal computer) or a facsimile used by a user.

In a printer job, job data of the printer job is transmitted from the external apparatus 1000 (user terminal) to the image forming apparatus 100 and is received by the communication portion 120. In a transmission job such as a fax job, via the communication portion 120, image data is transmitted from the image forming apparatus 100 to the external apparatus 1000.

Here, with respect to each of the plurality of the paper sheet cassettes 20, the control portion 110 detects a size of the paper sheet P loaded therein (performs size detection). In order to perform the size detection, a size sensor 22 is connected to the control portion 110. There are a plurality of the size sensors 22, which are provided with respect to the plurality of the paper sheet cassettes 20, respectively, and each has an output varying depending on a position of the regulation guide 21 in a corresponding one of the paper sheet cassettes 20. Then, based on an output of each of the plurality of the size sensors 22, the control portion 110 detects a size of the paper sheet P loaded in a corresponding one of the paper sheet cassettes 20.

Furthermore, with respect to each of the plurality of the paper sheet cassettes 20, the control portion 110 detects whether or not the each of the paper sheet cassettes 20 has been drawn out from inside the image forming apparatus 100 (performs cassette detection). In order to perform the cassette detection, a cassette sensor 23 is connected to the control portion 110. There are a plurality of the cassette sensors 23, which are provided with respect to the plurality of the paper sheet cassettes 20, respectively, and each has an output varying depending on whether or a corresponding one of the paper sheet cassettes 20 has been drawn out from inside the apparatus. Then, based on an output of each of the plurality of the cassette sensors 23, the control portion 110 detects that a corresponding one of the paper sheet cassettes 20 has been drawn out from inside the apparatus and that the corresponding one of the paper sheet cassettes 20 has been housed in the apparatus.

Furthermore, with respect to each of the plurality of the paper sheet cassettes 20, the control portion 110 detects a remaining quantity of the paper sheets P loaded therein (performs remaining quantity detection). In order to perform the remaining quantity detection, a paper sheet remaining quantity sensor 24 is connected to the control portion 110. There are a plurality of the paper sheet remaining quantity sensors 24, which are provided with respect to the plurality of the paper sheet cassettes 20, respectively. Each of the paper sheet remaining quantity sensors 24 is a photosensor and has an output varying depending on an inclination angle of the placing plate 20a. That is, an output of the paper sheet remaining quantity sensor 24 varies with increasing or decreasing number of paper sheets on the placing plate 20a. Then, based on an output of each of the plurality of the paper sheet remaining quantity sensors 24, the control portion 110 detects a paper sheet remaining quantity of a corresponding one of the paper sheet cassettes 20. Furthermore, the control portion 110 controls the storage portion 113 to store a paper sheet remaining quantity (detection result) of each of the plurality of the paper sheet cassettes 20.

For example, a paper sheet remaining quantity is categorized into a plurality of levels (for example, five levels of 100%, 70%, 50%, 30%, and 10%), and paper sheet remaining quantity information predetermining values of an output of the paper sheet remaining quantity sensor 24 corresponding to these levels, respectively, is stored in the storage portion 113. Further, the control portion 110 detects, as a paper sheet remaining quantity of the paper sheet cassette 20, one of the plurality of levels of paper sheet remaining quantity defined by the paper sheet remaining quantity information which corresponds to a value of the output of the paper sheet remaining quantity sensor 24.

Furthermore, the control portion 110 detects whether or not a paper jam has occurred in the paper sheet conveyance path PP while a printing job is being executed (performs paper jam detection). In order to perform the paper jam detection, a paper sheet presence/absence sensor 25 is connected to the control portion 110. There are a plurality of the paper sheet presence/absence sensors 25, which are provided at a predetermined plurality of detection positions in the paper sheet conveyance path PP, respectively. Each of the plurality of the paper sheet presence/absence sensors 25 has an output varying depending on presence/absence of the paper sheet P at a corresponding one of the detection positions. Then, based on an output of each of the plurality of the paper sheet presence/absence sensors 25, the control portion 110 detects that a tip end of the paper sheet P has arrived at a corresponding, one of the detection positions and that a rear end thereof has passed by the corresponding one of the detection positions so as to judge whether or not a paper jam has occurred.

For example, after detecting that the tip end of the paper sheet P has arrived at the detection position of a certain one (referred to as a first sensor) of the plurality of the paper sheet presence/absence sensors 25, the control portion 110 starts counting a length of time. Then, at a lapse of a prescribed length of time after the detection that the tip end of the paper sheet P has arrived at the first sensor's detection position, the control portion 110 detects whether or not the tip end of the paper sheet P has arrived at the detection position of another one (referred to as a second sensor) of the paper sheet presence/absence sensors 25 which is provided on a downstream side in the conveyance direction with respect to the first sensor. When, as a result thereof, such arrival of the tip end of the paper sheet P cannot be detected, the control portion 110 judges that a paper jam has occurred. The prescribed length of time in this case is a length of time required for the paper sheet P to travel between the first sensor's detection position and the second sensor's detection position and is a length of time that can be calculated beforehand based on a distance between the first sensor's detection position and the second sensor's detection position and a paper sheet conveyance speed.

Upon detecting that a paper jam has occurred while a printing job is being executed, the control portion 110 discontinues the printing job being executed. Then, the control portion 110 controls the operation panel 7 to display an error message so as to prompt a user to clear the paper jam. After that, when a state is established where the paper sheet P has been removed from the paper sheet conveyance path PP to enable execution of a printing job, the control portion 110 resumes the printing job that has been discontinued.

<Paper Sheet Setting>

The control portion 110 controls the operation panel 7 to accept paper sheet setting with respect to the paper sheet cassette 20 (setting related to the paper sheet P loaded in the paper sheet cassette 20). For example, as the paper sheet setting, with respect to each of the plurality of the paper sheet cassettes 20, the operation panel 7 accepts, from a user, setting of, for example, a size of the paper sheet P, a weight of the paper sheet P, a thickness of the paper sheet P, and a type of the paper sheet P loaded in a corresponding one of the paper sheet cassettes 20. Furthermore, with respect to each of the plurality of the paper sheet cassettes 20, the control portion 110 controls the storage portion 113 to store a piece of paper sheet information indicating a content of the paper sheet setting accepted by the operation panel 7.

Further, when executing a printing job, the control portion 110 recognizes one of the plurality of the paper sheet cassettes 20 which has been designated as a paper feed source by a user and checks a paper sheet size (a paper sheet size set through paper sheet setting by the user) indicated by a piece of paper sheet information corresponding to the one of the paper sheet cassettes 20 as the paper feed source. Moreover, based on an output of one of the size sensors 22 which corresponds to the one of the paper sheet cassettes 20 as the paper feed source, the control portion 110 detects a size of the paper sheet P loaded in the one of the paper sheet cassettes 20 as the paper feed source.

Then, when the set size (the paper sheet size set through paper sheet setting by the user) matches the detected size (the actual paper sheet size detected based on the output of the corresponding one of the size sensors 22), the control portion 110 starts the printing job. On the other hand, when the set size does not match the detected size, the control portion 110 does not start the printing job. In this case, the control portion 110 judges that a size mismatch error has occurred and thus controls the operation panel 7 to show an error notification. In a case where a size mismatch error has occurred, there is a need to change accordingly a piece of paper sheet information corresponding to one of the paper sheet cassettes 20 as a paper feed source (it is required that paper sheet setting be performed again). Or alternatively, it is required that a batch of the paper sheets P currently loaded in the one of the paper sheet cassettes 20 as the paper feed source be replaced.

Furthermore, when executing a printing job, based on a piece of paper sheet information (a weight, a thickness, a type, and so on of the paper sheet P) corresponding to one of the paper sheet cassettes 20 as a paper feed source, the control portion 110 determines a printing condition. For example, in accordance with a thickness of the paper sheet P indicated by the piece of paper sheet information corresponding to the one of the paper sheet cassettes 20 as the paper feed source, the control portion 110 changes a nip width of the fixing nip of the fixing portion 6. Assuming that an actual thickness of the paper sheet P loaded in the one of the paper sheet cassettes 20 as the paper feed source is different from a thickness of the paper sheet P set by a user, there occurs an inconvenience that a nip width of the fixing nip turns out to be too large (or too small) with respect to the actual thickness of the paper sheet P. In such a case, though no error occurs (the printing job is continued), a fixing failure or the like occurs to degrade image quality of an output image.

In a case where, as described above, a size, a weight, a thickness, and a type of the paper sheet P actually loaded in one of the paper sheet cassettes 20 as a paper feed source are different from contents (contents set through paper sheet setting by a user) indicated by a piece of paper sheet information corresponding to the one of the paper sheet cassettes 20 as the paper feed source, there may occur an error or degradation in image quality. For this reason, in a case where paper sheet replacement work of replacing a batch of the paper sheets P loaded in any one of the plurality of the paper sheet cassettes 20 with another batch of the paper sheets P has been performed, there is a need to update a piece of paper sheet information corresponding to the one of the paper sheet cassettes 20 as a subject of the work. Some users, however, may forget to update the piece of paper sheet information. There are also users who are not aware of such need to update the piece of paper sheet information.

As a solution to this, in this embodiment, when any one of the plurality of the paper sheet cassettes 20 has been drawn out from inside the image forming apparatus 100 or the any one of the paper sheet cassettes 20, which had been drawn out from inside the image forming apparatus 100, has been housed in the apparatus, a screen related to paper sheet setting (see FIG. 6 to FIG. 12) is displayed. At the time of replacing a batch of the paper sheets P, any one of the plurality of the paper sheet cassettes 20 is drawn out from the apparatus or housed in the apparatus. That is, when the paper sheet cassette 20 has been drawn out from inside the apparatus and when the paper sheet cassette 20 has been housed in the apparatus, there is a high possibility that replacement of a batch of the paper sheets P has been performed.

To be specific, the control portion 110 detects an operation of drawing out the paper sheet cassette 20 from inside the apparatus or an operation of housing the paper sheet cassette 20 in the apparatus as a reference operation for judging whether or not to control the operation panel 7 to display the screen related to paper sheet setting. Whether or not the reference operation has been performed is detected based on an output of the cassette sensor 23. Further, upon detecting that the reference operation has been performed, the control portion 110 controls the operation panel 7 to display the screen related to paper sheet setting.

Here, the operation of drawing out the paper sheet cassette 20 from inside the image forming apparatus 100 or the operation of housing the paper sheet cassette 20 in the apparatus is performed not only when paper sheet replacement work is performed but also when paper sheet replenishment work of replenishing the paper sheet cassette 20 with the paper sheets P is performed. Assuming that the screen related to paper sheet setting is displayed at the time of executing the paper sheet replenishment work, it is required to perform an operation of turning off that screen, which is burdensome to a user. Furthermore, some users may be confused, not understanding a reason why the screen related to paper sheet setting is being displayed.

In order to avoid this, upon detecting that the reference operation has been performed, based on an execution status of a printing job at that time, a paper sheet remaining quantity of the paper sheet cassette 20, or the like, the control portion 110 judges whether or not to display the screen related to paper sheet setting. That is, even when the paper sheet cassette 20 is drawn out from the image forming apparatus 100 or housed therein, the screen related to paper sheet setting may not be displayed.

As will be described in detail later, the screen related to paper sheet setting refers to a notification screen 210 (see FIG. 6), a selection screen 220 (see FIG. 7), a setting screen 230 (see FIG. 8 to FIG. 12) and the like. Further, upon detection of the reference operation, a screen to be displayed first is the notification screen 210. A configuration, however, may be adopted in which, upon detection of the reference operation, with display of the notification screen 210 omitted, the selection screen 220 is displayed first, or the setting screen 230 corresponding to one of the paper sheet cassettes 20 which has been drawn out or housed is displayed first.

First, a description is given of a flow of a process performed at the time of judging whether or not to display the screen related to paper sheet setting.

(A Flow of a Process in a Case Where an Operation of Drawing Out the Paper Sheet Cassette from Inside the Apparatus Is Used as the Reference Operation)

Figure 3:
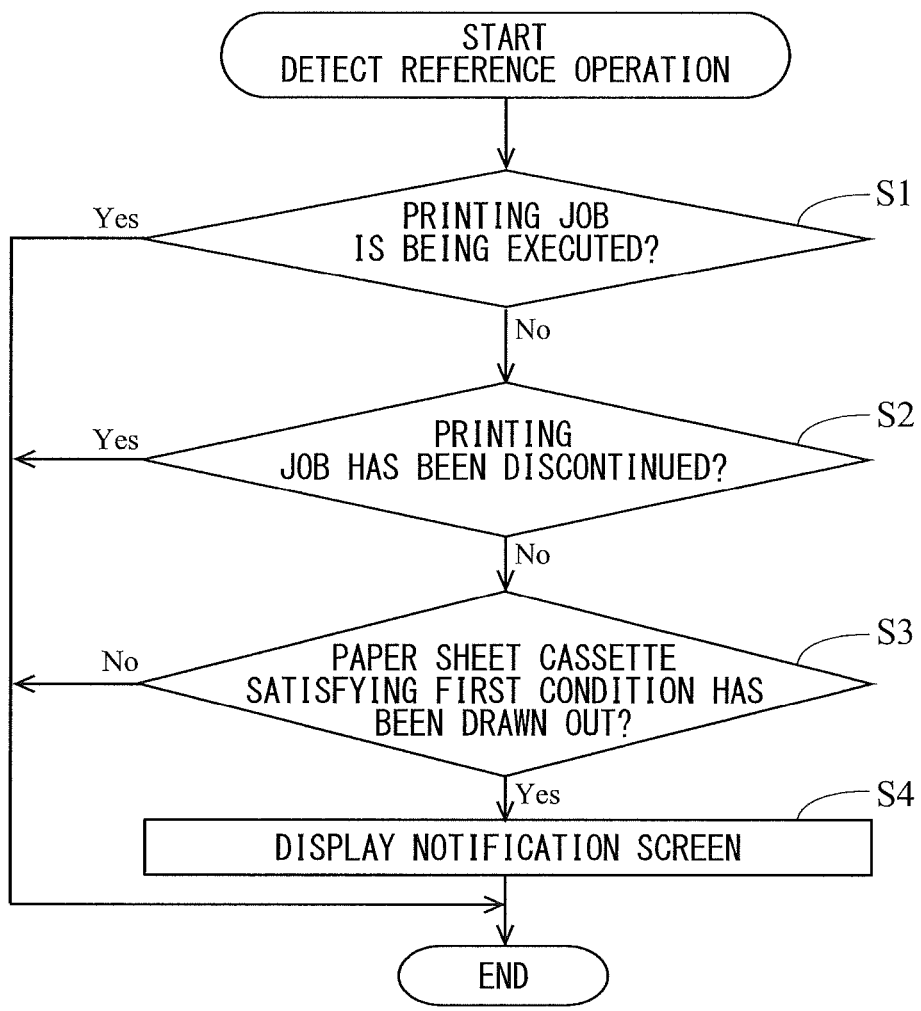
FIG. 3 is a flow chart for explaining a flow of a judgment process that is performed when, in the image forming apparatus according to the one embodiment of the present disclosure, an operation (reference operation) of drawing out a paper sheet cassette from inside the apparatus has been detected.

With reference to a flow chart shown in FIG. 3, a description is given of a flow of a process that is performed when, in a configuration in which an operation of drawing out the paper sheet cassette 20 from inside the image forming apparatus 100 is used as the reference operation, the reference operation has been detected.

The flow chart shown in FIG. 3 is started upon the control portion 110 detecting that the reference operation has been performed. That is, when any one of the plurality of the paper sheet cassettes 20 has been drawn out from inside the image forming apparatus 100, the flow chart shown in FIG. 3 is started. At a point in time when the flow chart shown in FIG. 3 is started, a printing job may be being executed or may have been discontinued due to occurrence of a paper jam. Furthermore, there may be a case where a printing job is not being executed and a job other than the printing job is being executed. Moreover, there may be a case where a job itself of any type including a printing job is not being executed.

After detecting the reference operation, at Step S1, the control portion 110 judges whether or not a printing job is being executed (whether or not the reference operation has been detected while the printing job is being executed). In a case where, as a result thereof, the control portion 110 judges that a printing job is being executed, this flow is completed. In this case, the screen related to paper sheet setting (notification screen 210) is not displayed, and thus acceptance of paper sheet setting is not performed.

Here, when a paper sheet shortage occurs while a printing job is being executed, the printing job is discontinued disadvantageously. For this reason, in order to prevent a printing job from being discontinued, replenishment of the paper sheets P is often performed (the paper sheet cassette 20 is drawn out or housed) while the printing job is being executed. That is, in a case where the paper sheet cassette 20 has been drawn out or housed while a printing job is being executed, there is a high possibility that the operation of drawing out the paper sheet cassette 20 or the operation of housing the paper sheet cassette 20 has been performed for the purpose of replenishment of the paper sheets P. Thus, when the reference operation has been performed while a printing job is being executed, the control portion 110 performs control so that the screen related to paper sheet setting (notification screen 210) is not displayed.

In a case where, at Step S1, the control portion 110 judges that a printing job is not being executed, a transition is made to Step S2. Upon the transition to Step S2, the control portion 110 judges whether or not the printing job has been discontinued (whether or not the reference operation has been detected in a time period in which the printing job is discontinued). In a case where, as a result thereof, the control portion 110 judges that the printing job has been discontinued, this flow is completed. In this case, the screen related to paper sheet setting (notification screen 210) is not displayed, and thus acceptance of paper sheet setting is not performed.

Here, a printing job being executed is discontinued due to occurrence of a paper jam. When a printing job is discontinued in this manner, in many cases, in order to remove the paper sheet P remaining in the paper sheet conveyance path PP, the paper sheet cassette 20 is drawn out from the image forming apparatus 100. That is, in a case where the paper sheet cassette 20 has been drawn out or housed when a printing job has been discontinued, there is a high possibility that the operation of drawing out the paper sheet cassette 20 or the operation of housing the paper sheet cassette 20 has been performed for the purpose of clearing a paper jam. Thus, when the reference operation has been performed in a time period in which a printing job is discontinued, the control portion 110 performs control so that the screen related to paper sheet setting (notification screen 210) is not displayed.

In a case where, at Step S2, the control portion 110 judges that a printing job has not been discontinued, a transition is made to Step S3. Upon the transition to Step S3, the control portion 110 judges whether or not one of the paper sheet cassettes 20 which has been drawn out from inside the apparatus (one of the paper sheet cassettes 20 as a subject of the drawing-out operation performed as the reference operation) is a paper sheet cassette that satisfies a first condition. In a case where the one of the paper sheet cassettes 20 which has been drawn out from inside the apparatus has a high paper sheet remaining quantity, the control portion 110 judges that said one of the paper sheet cassettes 20 is a paper sheet cassette 20 that satisfies the first condition.

In order to perform this judgment, with respect to the one of the paper sheet cassettes 20 which has been drawn out from inside the apparatus, the control portion 110 checks a paper sheet remaining quantity thereof immediately before being drawn out. Further, in a case where it is found that, immediately before being drawn out, the one of the paper sheet cassettes 20 which has been drawn out from inside the apparatus had a paper sheet remaining quantity higher than a predetermined threshold value (for example, 10% to 30%), the control portion 110 judges that the one of the paper sheet cassettes 20 which has been drawn out from inside the apparatus is the paper sheet cassette 20 that satisfies the first condition (a paper sheet cassette 20 that, immediately before being drawn out, had a high paper sheet remaining quantity).

In a case where, as a result of the judgment at Step S3, it is found that the one of the paper sheet cassettes 20 which has been drawn out from inside the apparatus does not satisfy the first condition, i.e., immediately before being drawn out, said one of the paper sheet cassettes 20 had a low paper sheet remaining quantity, this flow is completed. In this case, the screen related to paper sheet setting (notification screen 210) is not displayed, and thus acceptance of paper sheet setting is not performed.

Here, in a case where the one of the paper sheet cassettes 20 which has been drawn out from inside the apparatus has a low paper sheet remaining quantity, there is a high possibility that the drawing-out operation has been performed for the purpose of replenishing said one of the paper sheet cassettes 20 with the paper sheets P. Thus, when, even in a time period other than while a printing job is being executed, one of the paper sheet cassettes 20 which has a paper sheet remaining quantity not higher than the threshold value (a paper sheet cassette 20 that does not satisfy the first condition) has been drawn out from inside the apparatus, the control portion 110 performs control so that the screen related to paper sheet setting (notification screen 210) is not displayed.

In a case where, at Step S3, it is found that the one of the paper sheet cassettes 20 which has been drawn out from inside the apparatus is the paper sheet cassette 20 that satisfies the first condition, a transition is made to Step S4. Upon the transition to Step S4, the control portion 110 controls the operation display portion 7 to display the screen related to paper sheet setting (notification screen 210). That is, when, in a time period other than while a printing job is being executed, one of the paper sheet cassettes 20 which has a paper sheet remaining quantity higher than the threshold value has been drawn out from inside the apparatus, the control portion 110 performs control so that the screen related to paper sheet setting (notification screen 210) is displayed.

The process at Step S3 may be omitted. That is, a configuration may be adopted in which in a case where, as a result of the judgment at Step S2, it is found that a printing job has not been discontinued, the screen related to paper sheet setting (notification screen 210) is displayed.

(A Flow of a Process in a Case Where an Operation of Housing the Paper Sheet Cassette in the Apparatus Is Used as the Reference Operation)

Figure 4:
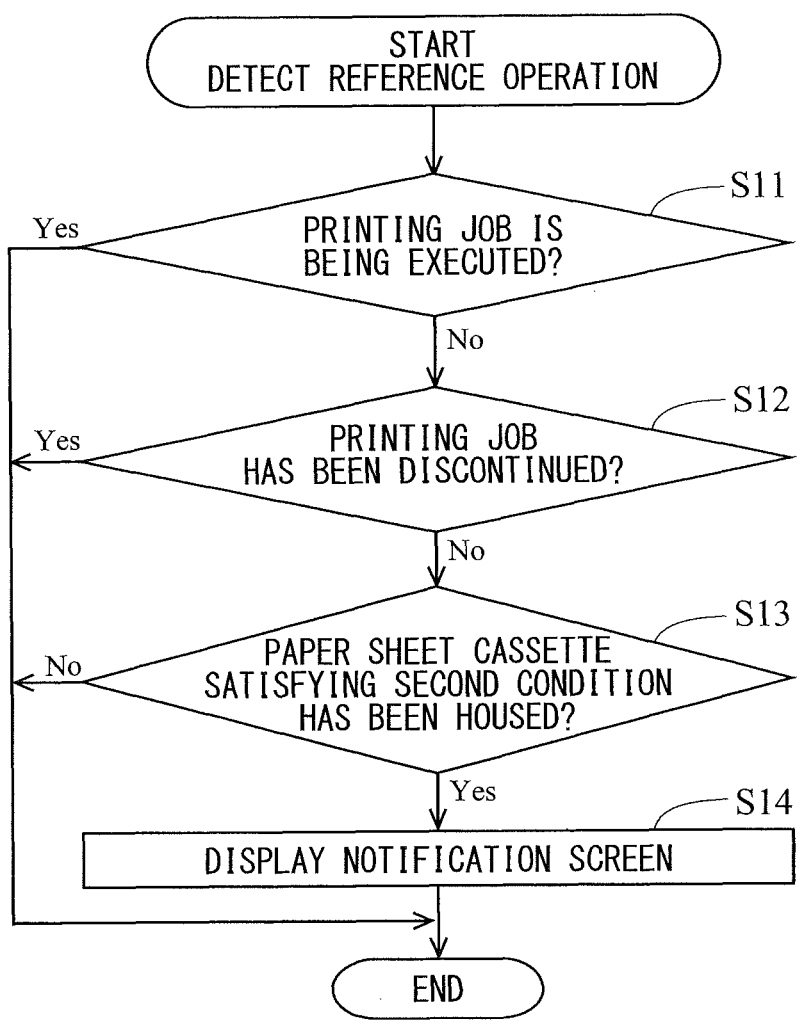
FIG. 4 is a flow chart for explaining a flow of a judgment process that is performed when, in the image forming apparatus according to the one embodiment of the present disclosure, an operation (reference operation) of housing a paper sheet cassette in the apparatus has been detected.

With reference to a flow chart shown in FIG. 4, a description is given of a flow of a process that is performed when, in a configuration in which an operation of housing the paper sheet cassette 20 in the image forming apparatus 100 is used as the reference operation, the reference operation has been detected.

The flow chart shown in FIG. 4 is started upon the control portion 110 detecting that the reference operation has been performed. That is, any one of the plurality of the paper sheet cassettes 20 has been housed in the image forming apparatus 100, the flow chart shown in FIG. 4 is started. At a point in time when the flow chart shown in FIG. 4 is started, a printing job may be being executed or may have been discontinued due to occurrence of a paper jam. Furthermore, there may be a case where a printing job is not being executed and a job other than the printing job is being executed. Moreover, there may be a case where a job itself of any type including a printing job is not being executed.

Processes at Steps S11 and S12 in the flow chart shown in FIG. 4 are the same as the processes at Steps 51 and S2 in the flow chart shown in FIG. 3. Descriptions of the processes at Steps S11 and S12 in the flow chart shown in FIG. 4 are, therefore, omitted by referring to the descriptions of the processes at Steps S1 and S2 in the flow chart shown in FIG. 3.

In a case where, at Step S12, the control portion 110 judges that a printing job has not been discontinued, a transition is made to Step S13. Upon the transition to Step S13, the control portion 110 judges whether or not one of the paper sheet cassettes 20 which has been housed in the apparatus (a paper sheet cassette 20 as an operation subject of the housing operation as the reference operation) is a paper sheet cassette that satisfies a second condition. In a case where, immediately before being drawn out from inside the apparatus, the one of the paper sheet cassettes 20 which has been housed in the apparatus had a high paper sheet remaining quantity, the control portion 110 judges that said one of the paper sheet cassettes 20 is a paper sheet cassette 20 that satisfies the second condition.

In order to perform this judgment, with respect to the one of the paper sheet cassettes 20 which has been housed in the apparatus, the control portion 110 checks a paper sheet remaining quantity thereof immediately before being drawn out from inside the apparatus. Further, in a case where it is found that, immediately before being drawn out from inside the apparatus, the one of the paper sheet cassettes 20 which has been housed in the apparatus had a paper sheet remaining quantity higher than a predetermined threshold value (for example, 10% to 30%), the control portion 110 judges that the one of the paper sheet cassettes 20 which has been housed in the apparatus is the paper sheet cassette 20 that satisfies the second condition (a paper sheet cassette 20 that, immediately before being drawn out from inside the apparatus, had a high paper sheet remaining quantity).

In a case where, as a result of the judgment at Step S13, it is found that the one of the paper sheet cassettes 20 which has been housed in the apparatus does not satisfy the second condition, i.e., immediately before being drawn out from inside the apparatus, said one of the paper sheet cassettes 20 had a low paper sheet remaining quantity, this flow is completed. In this case, the screen related to paper sheet setting (notification screen 210) is not displayed, and thus no paper sheet setting is accepted. That is, when, even in a time period other than while a printing job is being executed, one of the paper sheet cassettes 20 which, immediately before being drawn out from inside the apparatus, had a paper sheet remaining quantity not higher than the threshold value (a paper sheet cassette 20 that does not satisfy the second condition) has been housed in the apparatus, the control portion 110 performs control so that the screen related to paper sheet setting (notification screen 210) is not displayed.

In a case where, at Step S13, it is found that the one of the paper sheet cassettes 20 which has been housed in the apparatus is the paper sheet cassette 20 that satisfies the second condition, a transition is made to Step S14. Upon the transition to Step S14, the control portion 110 controls the operation display portion 7 to display the screen related to paper sheet setting (notification screen 210). That is, when, in a time period other than while a printing job is being executed, one of the paper sheet cassettes 20 which, immediately before being drawn out from inside the apparatus, had a paper sheet remaining quantity higher than the threshold value has been housed in the apparatus, the control portion 110 performs control so that the screen related to paper sheet setting (notification screen 210) is displayed.

The process at Step S13 may be omitted. That is, a configuration may be adopted in which in a case where, as a result of the judgment at Step S12, it is found that a printing job has not been discontinued, the screen related to paper sheet setting (notification screen 210) is displayed.

Next, a description is given of a flow of a process performed when paper sheet setting is accepted on the screen related to paper sheet setting.

(A Flow of a Process in a Case Where Paper Sheet Setting Is Accepted When the Paper Sheet Cassette Has Been Drawn Out)

Figure 5:
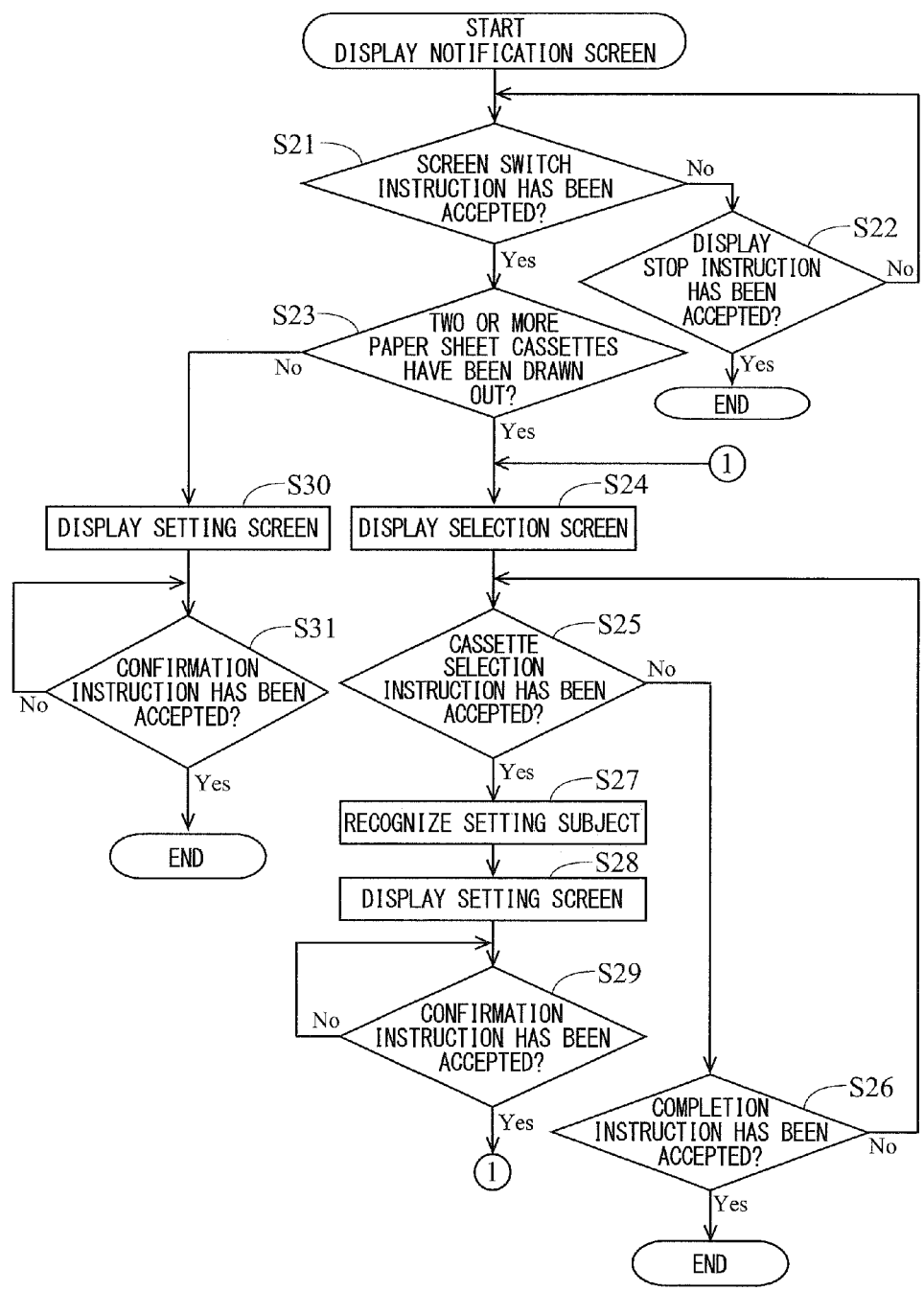
FIG. 5 is a flow chart for explaining a flow of an acceptance process of accepting paper sheet setting that is performed when, in the image forming apparatus according to the one embodiment of the present disclosure, a paper sheet cassette has been drawn out from inside the apparatus.

With reference to a flow chart shown in FIG. 5, a description is given of a flow of a process in a case where paper sheet setting is accepted when any one of the plurality of the paper sheet cassettes 20 has been drawn out from inside the image forming apparatus 100.

The flow chart shown in FIG. 5 is started upon the control portion 110 detecting an operation (reference operation) of drawing out the any one of the plurality of the paper sheet cassettes 20 from inside the image forming apparatus 100 and display of the notification screen 210 by the operation panel 7 being started. That is, when, in a time period that is not a time period in which a printing job is executed nor a time period in which the printing job is discontinued, one of the paper sheet cassettes 20 which satisfies the first condition has been drawn out from inside the apparatus, the flow chart shown in FIG. 5 is started.

Figure 6:
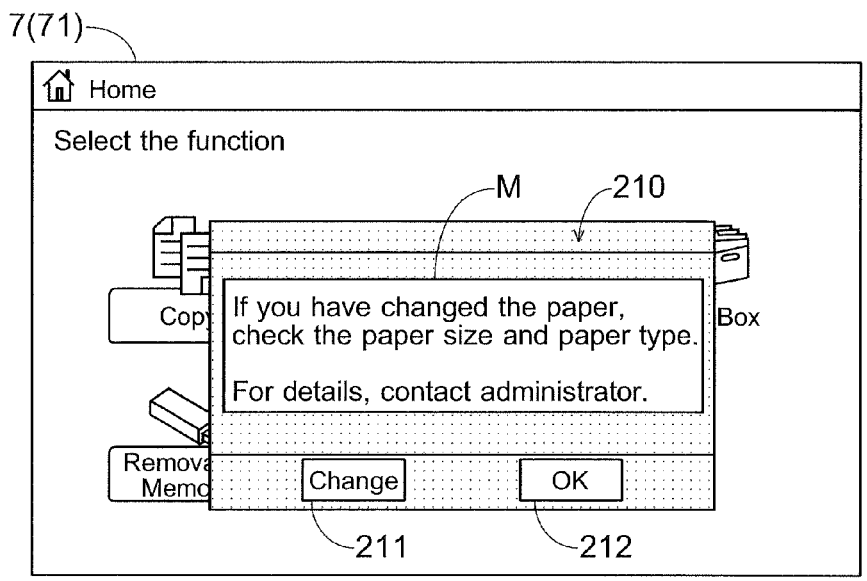
FIG. 6 is a diagram showing a notification screen (dialogue box) that is displayed on an operation panel of the image forming apparatus according to the one embodiment of the present disclosure.

Here, on a screen currently being displayed, the operation panel 7 displays, in a pop-up manner, the notification screen 210 (dialogue box) as shown in FIG. 6. In a screen of the notification screen 210, a notification message M for prompting a user to perform paper sheet setting is provided. Though there is no particular limitation, in a case where a batch of the paper sheets P that had been loaded in the paper sheet cassette 20 has been replaced with another batch of the paper sheets P, a message to prompt checking of a size and a type of said batch of the paper sheets P is shown as the notification message M.

Furthermore, in the screen of the notification screen 210, as soft keys, a screen switch key 211 and an OK key 212 are provided. The screen switch key 211 is a key for accepting a switch instruction to switch a display screen from the notification screen 210 to an after-mentioned selection screen 220 (see FIG. 7). In FIG. 6, a soft key labeled "Change" corresponds to the screen switch key 211. The OK key 212 is a key for accepting a stop instruction to stop display of the notification screen 210.

Upon start of display of the notification screen 210 described above, at Step S21 in FIG. 5, the control portion 110 judges whether or not the operation panel 7 has accepted a screen switch instruction (a touch operation with respect to the screen switch key 211 on the notification screen 210). In a case where, as a result thereof, the control portion 110 judges that the screen switch instruction has not been accepted, a transition is made to Step S22.

Upon the transition to Step S22, the control portion 110 judges whether or not the operation panel 7 has accepted a display stop instruction (a touch operation with respect to the OK key 212 on the notification screen 210). In a case where, as a result thereof, the control portion 110 judges that the display stop instruction has been accepted, the display of the notification screen 210 is stopped to complete this flow. On the other hand, in a case where the control portion 110 judges that the display stop instruction has not been accepted, the judgment at Step S21 is repeatedly performed.

In a case where, at Step S21, the control portion 110 judges that the screen switch instruction (the touch operation with respect to the screen switch key 211 on the notification screen 210) has been accepted, a transition is made to Step S23. Upon the transition to Step S23, the control portion 110 judges whether or not two or more of the plurality of the paper sheet cassettes 20 have been drawn out from inside the apparatus. In a case where, as a result thereof, it is found that the two or more of the paper sheet cassettes 20 have been drawn out from inside the apparatus, a transition is made to Step S24. That is, in a case where, in a period of time from a time when the notification screen 210 is displayed as a result of any one of the plurality of the paper sheet cassettes 20 being drawn out from inside the apparatus to a time when the screen switch instruction (the touch operation with respect to the screen switch key 211 on the notification screen 210) is received, another one of the paper sheet cassettes 20 has been drawn out from inside the apparatus, a transition is made to Step S24.

A configuration may also be adopted in which only in a case where two or more of the paper sheet cassettes 20 which satisfy the first condition (those ones of the paper sheet cassettes 20 which, immediately before being drawn out, had paper sheet remaining quantities higher than the threshold value) have been drawn out from inside the apparatus, a transition is made to Step S24. That is, a configuration may be adopted in which in a case where two or more of the paper sheet cassettes 20 have been drawn out from inside the apparatus, but only one of them satisfies the first condition, a transition is made to Step S30.

Figure 7:
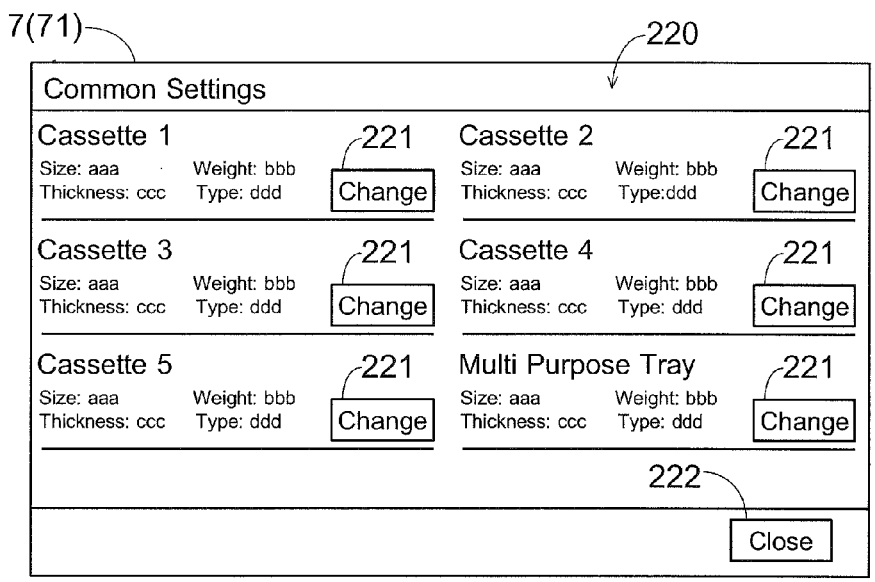
FIG. 7 is a diagram showing a selection screen that is displayed on the operation panel of the image forming apparatus according to the one embodiment of the present disclosure.

Upon the transition to Step S24, the control portion 110 controls the operation panel 7 to display the selection screen 220 (see FIG. 7). After that, a transition is made to Step S25.

In a screen of the selection screen 220, as shown in FIG. 7, a plurality of selection keys 221 (soft keys) that correspond to the plurality of the paper sheet cassettes 20, respectively, are provided. Furthermore, to each of the plurality of selection keys 221, text information indicating a set content of paper sheet setting performed with respect to a corresponding one of the paper sheet cassettes 20 (a current content of paper sheet information set through paper sheet setting by a user) is annexed. That is, a size (Size), a weight (Weight), a thickness (Thickness), and a type (Type) of the paper sheet P are displayed. In FIG. 7, for the sake of convenience, a paper sheet size is represented by "aaa", a weight by "bbb", a thickness by "ccc", and a type by "ddd". In a case where an unshown manual feed tray (Multi-purpose Tray) is provided in the image forming apparatus 100, another selection key 221 corresponding to the manual feed tray is provided in the screen of the selection screen 220.

Here, the selection screen 220 is a screen for accepting a selection instruction to select one of the plurality of the paper sheet cassettes 20 as a setting subject of paper sheet setting. That is, a touch operation performed with respect to any one of the plurality of selection keys 221 enables paper sheet setting with respect to one of the paper sheet cassettes 20 which corresponds to the any one of the plurality of selection keys 221 with respect to which the touch operation has been performed.

In the screen of the selection screen 220, as a soft key, a completion key 222 is provided. The completion key 222 is a key for accepting a completion instruction to complete paper sheet setting. When a touch operation is performed with respect to the completion key 222, display of the selection screen 220 is stopped to complete acceptance of paper sheet setting. In FIG. 7, a soft key labeled "Close" corresponds to the completion key 222.

Upon the transition to Step S25 in FIG. 5, the control portion 110 judges whether or not a cassette selection instruction (a touch operation with respect to any one of the plurality of selection keys 221 on the selection screen 220)

has been accepted. In a case where, as a result thereof, the control portion 110 judges that the cassette selection instruction has not been accepted, a transition is made to Step S26. Upon the transition to Step S26, the control portion 110 judges whether or not a completion instruction to complete paper sheet setting (a touch operation with respect to the completion key 222 on the selection screen 220) has been accepted. In a case where, as a result thereof, the control portion 110 judges that the completion instruction to complete paper sheet setting has not been accepted, a return is made to Step S25. On the other hand, in a case where the control portion 110 judges that the completion instruction to complete paper sheet setting has been accepted, this flow is completed.

In a case where, at Step S25, the control portion 110 judges that the cassette selection instruction (the touch operation with respect to any one of the plurality of selection keys 221 on the selection screen 220) has been accepted, a transition is made to Step S27. Upon the transition to Step S27, the control portion 110 recognizes, as a setting subject of paper sheet setting, one of the paper sheet cassettes 20 which has been selected on the selection screen 220 (one of the paper sheet cassettes 20 which corresponds to the any one of the selection keys 221 with respect to which the touch operation has been performed).

After that, at Step S28, the control portion 110 controls the operation panel 7 to display the setting screen 230 (see FIG. 8) corresponding to the one of the paper sheet cassettes 20 as the setting subject.

Figure 8:
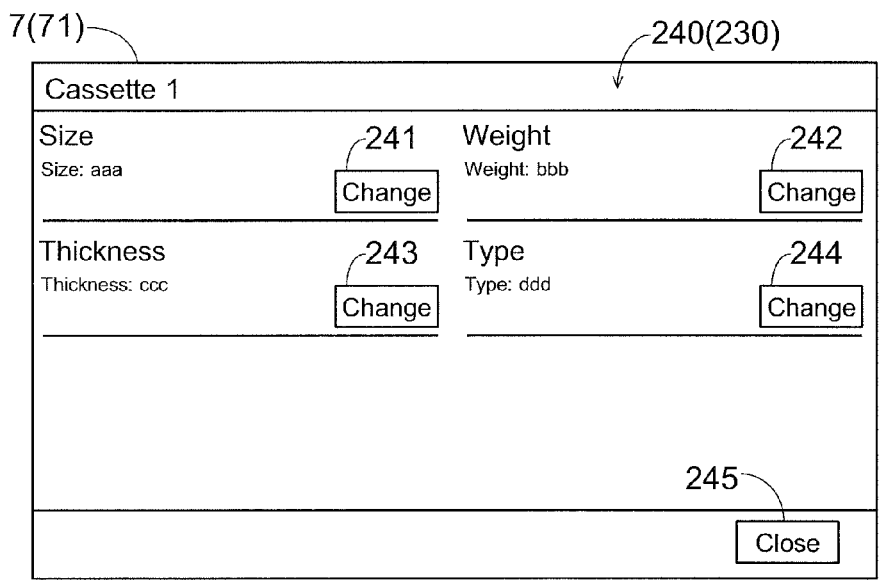
FIG. 8 is a diagram showing a setting screen (item screen) that is displayed on the operation panel of the image forming apparatus according to the one embodiment of the present disclosure.
Figure 9:
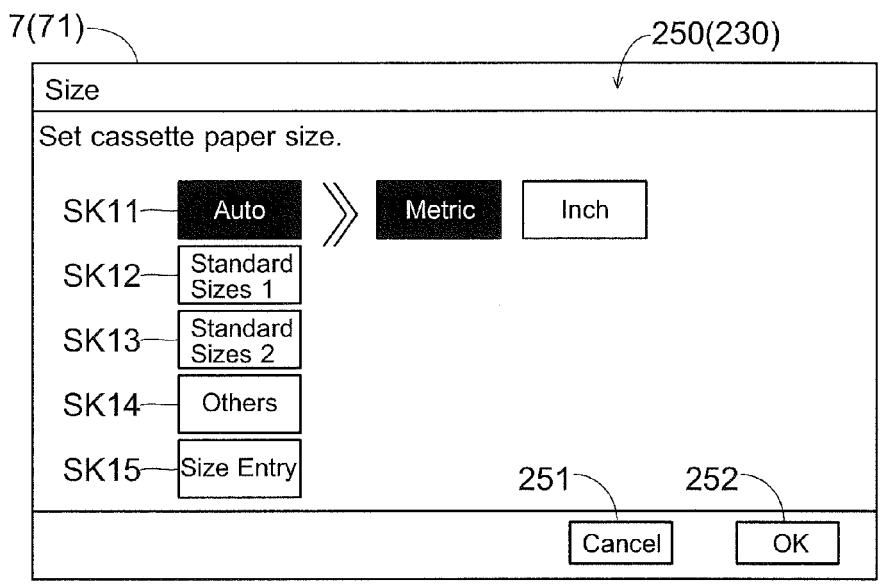
FIG. 9 is a diagram showing a setting screen (a screen for setting a size of a paper sheet) that is displayed on the operation panel of the image forming apparatus according to the one embodiment of the present disclosure.

The setting screen 230 displayed by the operation panel 7 at this time is, as shown in FIG. 8, an item screen 240 for selecting an item to be set. That is, the item screen 240 is a screen for selecting an item to be set (changed) from among a size, a weight, a thickness, and a type of the paper sheet P.

In a screen of the item screen 240, as soft keys, a plurality of item keys 241 to 244 are provided. The plurality of item keys 241 to 244 correspond to a size, a weight, a thickness, and a type of the paper sheet P, respectively. In FIG. 8, a plurality of soft keys each labeled "Change" correspond to the item keys 241 to 244, respectively. Furthermore, to each of the plurality of item keys 241 to 244, text information indicating a set content of a corresponding item (a current content of paper sheet information set through paper sheet setting by a user) is annexed.

In the screen of the item screen 240, as a soft key, a confirmation key 245 is provided. The confirmation key 245 is a key for accepting a confirmation instruction to confirm a content set on any of after-mentioned detail setting screens 250 (see FIG. 9 to FIG. 12). Furthermore, the confirmation key 245 is also a key for accepting a switch instruction to switch a display screen to the selection screen 220 (see FIG. 7). When a touch operation is performed with respect to the confirmation key 245, a content set on any of the after-mentioned detail setting screens 250 (see FIG. 9 to FIG. 12) is confirmed and stored as paper sheet information in the storage portion 113. Then, a display screen is switched from the item screen 240 to the selection screen 220. In FIG. 8, a soft key labeled "Close" corresponds to the confirmation key 245.

For example, upon a touch operation with respect to the item key 241 being performed, the control portion 110 controls the operation panel 7 to display, as the setting screen 230, the detail setting screen 250 (see FIG. 9) for accepting setting of a size of the paper sheet P. In a screen of the detail setting screen 250 shown in FIG. 9, a plurality of soft keys SK11 to SK15 are provided.

By performing a touch operation with respect to the soft key SK11, a paper sheet size can be set to be in an automatic setting mode. In this case, a unit system can be designated to be in "millimeters" or "inches". By performing a touch operation with respect to the soft keys SK12 and SK13, a plurality of standard sizes are displayed as choices, a desired one of which can be set. By performing a touch operation with respect to the soft key SK14, a plurality of non-standard sizes (for example, pre-registered sizes) are displayed as choices, a desired one of which can be set. By performing a touch operation with respect to the soft key SK15, for example, a numeric value input key is displayed, by using which a numeric value of a desired size can be inputted.

Figure 10:
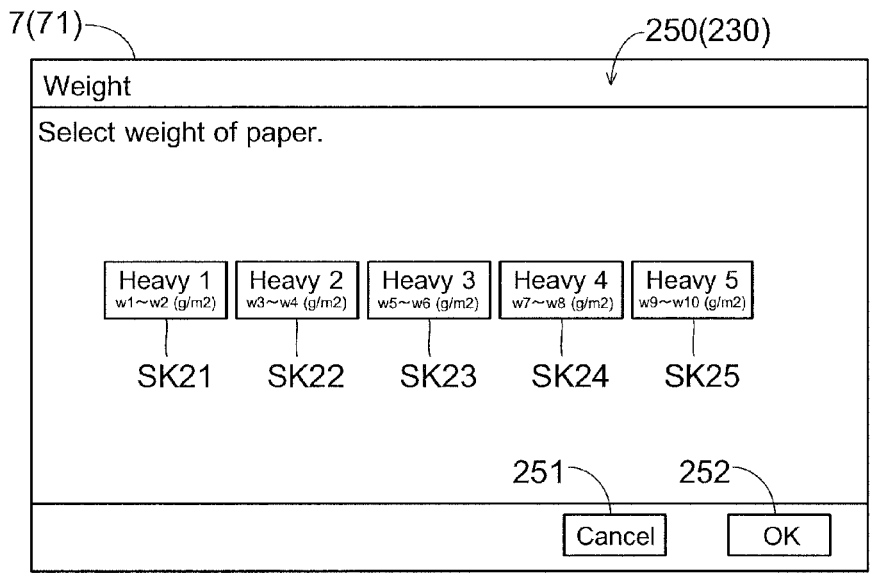
FIG. 10 is a diagram showing a setting screen (a screen for setting a weight of a paper sheet) that is displayed on the operation panel of the image forming apparatus according to the one embodiment of the present disclosure.

Furthermore, upon a touch operation with respect to the item key 242 being performed, the control portion 110 controls the operation panel 7 to display, as the setting screen 230, the detail setting screen 250 (see FIG. 10) for accepting setting of a weight of the paper sheet P. In a screen of the detail setting screen 250 shown in FIG. 10, a plurality of soft keys SK21 to SK25 are provided. The plurality of soft keys SK21 to SK25 are keys corresponding to weight ranges different from one another, respectively, and are each set so that a weight corresponding thereto increases in the order of the soft keys SK21 to SK25. Further, in a case of setting a weight of the paper sheet P, it is sufficient to perform a touch operation with respect to one of the plurality of soft keys SK21 to SK25 which corresponds to a desired weight. In FIG. 10, weight values are denoted as w1 to w10.

Figure 11:
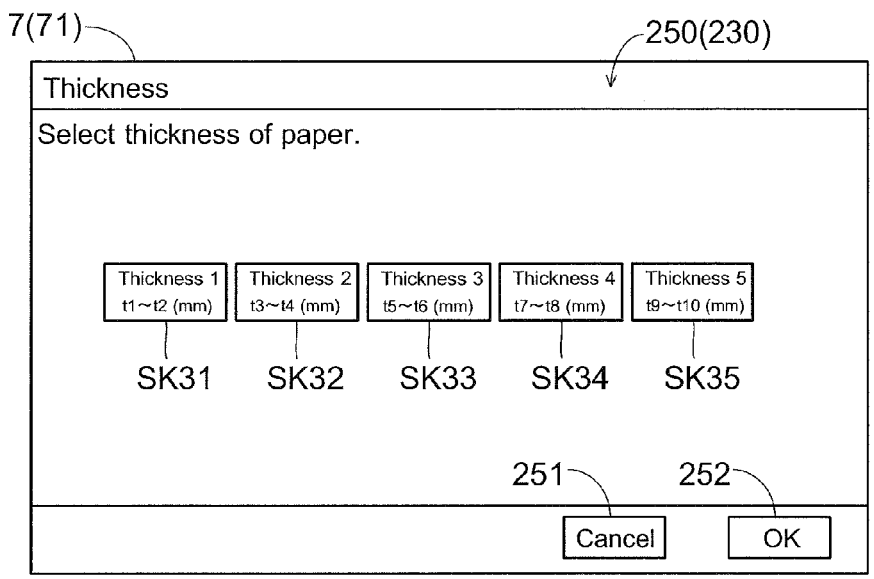
FIG. 11 is a diagram showing a setting screen (a screen for setting a thickness of a paper sheet) that is displayed on the operation panel of the image forming apparatus according to the one embodiment of the present disclosure.
Figure 12:
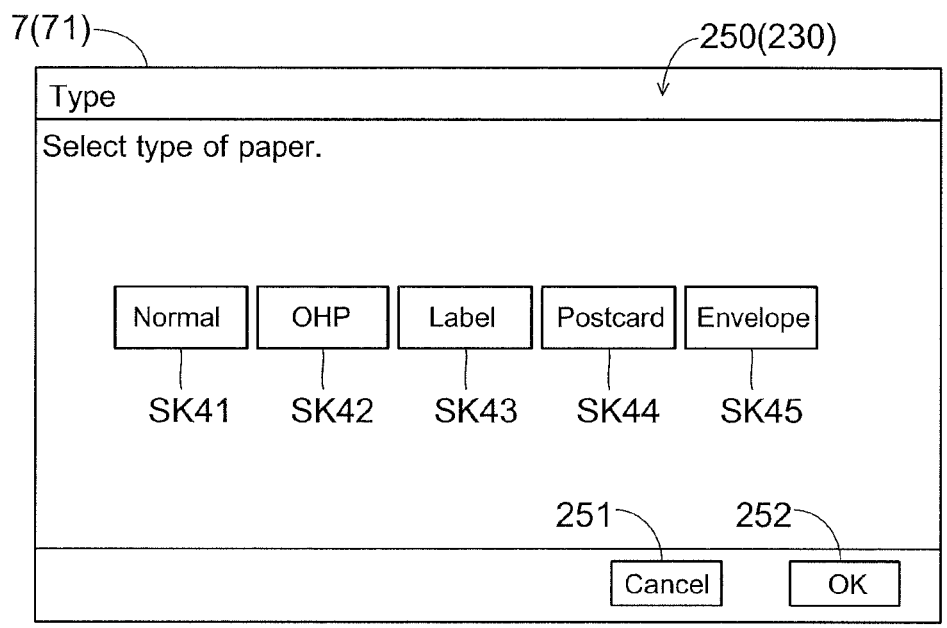
FIG. 12 is a diagram showing a setting screen (a screen for setting a type of a paper sheet) that is displayed on the operation panel of the image forming apparatus according to the one embodiment of the present disclosure.

Furthermore, upon a touch operation with respect to the item key 243 being performed, the control portion 110 controls the operation panel 7 to display, as the setting screen 230, the detail setting screen 250 (see FIG. 11) for accepting setting of a thickness of the paper sheet P. In a screen of the detail setting screen 250 shown in FIG. 11, a plurality of soft keys SK31 to SK35 are provided. The plurality of soft keys SK31 to SK35 are keys corresponding to thickness ranges different from one another, respectively, and are each set so that a thickness corresponding thereto increases in the order of the soft keys SK31 to SK35. Further, in a case of setting a thickness of the paper sheet P, it is sufficient to perform a touch operation with respect to one of the plurality of soft keys SK31 to SK35 which corresponds to a desired thickness. In FIG. 11, thickness values are denoted as t1 to t10.

Furthermore, upon a touch operation with respect to the item key 244 being performed, the control portion 110 controls the operation panel 7 to display, as the setting screen 230, the detail setting screen 250 (see FIG. 12) for accepting setting of a type of the paper sheet P. In a screen of the detail setting screen 250 shown in FIG. 12, a plurality of soft keys SK41 to SK45 are provided. The plurality of soft keys SK41 to SK45 are keys corresponding to paper types different from one another, respectively. Though there is not particular limitation, the plurality of soft keys SK41 to SK45 correspond to regular paper, an OHP sheet, a label, a post card, and an envelope, respectively. Further, in a case of setting a type of the paper sheet P, it is sufficient to perform a touch operation with respect to one of the plurality of soft keys SK41 to SK45 which corresponds to a desired paper type.

Furthermore, on each of the detail setting screens 250 (see FIG. 9 to FIG. 12), as soft keys, a cancel key 251 and an OK key 252 are provided. The cancel key 251 is a key for accepting a cancellation instruction to cancel a content set on any of the detail setting screens 250. The OK key 252 is a key for accepting a switch instruction to switch a display screen to the item screen 240 (see FIG. 8). A touch operation performed with respect to the OK key 252 causes a display screen to switch from any of the detail setting screens 250 to the item screen 240.

Upon a transition to Step S29 shown in FIG. 5, the control portion 110 judges whether or not the operation panel 7 has accepted a confirmation instruction (a touch operation with respect to the confirmation key 245 on the item screen 240). In a case where, as a result thereof, the control portion 110 judges that the confirmation instruction has been accepted, a return is made to Step S24. That is, the selection screen 220 (see FIG. 7) is displayed on the operation panel 7. This enables subsequent paper sheet setting with respect to another one of the paper sheet cassettes 20. When a return is made from Step S29 to Step S24, the control portion 110 controls the storage portion 113 to store, as paper sheet information, a content set on any of the detail setting screens 250. On the other hand, in a case where the control portion 110 judges that the confirmation instruction has not been accepted, the judgment at Step S29 is repeatedly performed.

Furthermore, in a case where, at Step S23, the control portion 110 judges that only one of the plurality of the paper sheet cassettes 20 has been drawn out from inside the apparatus, a transition is made to Step S30. That is, in a case where, in a period of time from a time when the notification screen 210 is displayed as a result of any one of the plurality of the paper sheet cassettes 20 being drawn out from inside the apparatus to a time when a screen switch instruction (a touch operation with respect to the screen switch key 211 on the notification screen 210) is received, another one of the paper sheet cassettes 20 is not drawn out from inside the apparatus, a transition is made to Step S30.

Upon the transition to Step S30, the control portion 110 recognizes, as a setting subject of paper sheet setting, one of the plurality of the paper sheet cassettes 20 which has most recently been drawn out from inside the apparatus and controls the operation panel 7 to display the setting screen 230 (see FIG. 8 to FIG. 12) corresponding to the one of the paper sheet cassettes 20 as the setting subject. Further, upon displaying the setting screen 230, the operation panel 7 switches a display screen in accordance with an operation performed with respect to the setting screen 230 and accepts various types of paper sheet setting. In this case, the selection screen 220 (see FIG. 7) is not displayed.

Subsequently, at Step S31, the control portion 110 judges whether or not the operation panel 7 has accepted a confirmation instruction (a touch operation with respect to the confirmation key 245 on the item screen 240). In a case where, as a result thereof, the control portion 110 judges that the confirmation instruction has been accepted, this flow is completed (paper sheet setting is completed). At this time, the control portion 110 controls the storage portion 113 to store, as paper sheet information, a content set on any of the detail setting screens 250 (see FIG. 9 to FIG. 12). That is, the selection screen 220 (see FIG. 7) is not displayed. Even in this case, however, a configuration may be adopted in which a confirmation instruction is received to display the selection screen 220, and a completion instruction to complete paper sheet setting is received to complete the paper sheet setting. On the other hand, in a case where the control portion 110 judges that the confirmation instruction has not been accepted, the judgment at Step S31 is repeatedly performed.

In a case of a configuration in which the fact that any one of the plurality of the paper sheet cassettes 20 has been drawn out from inside the apparatus is used as a trigger to display the notification screen 210 (see FIG. 6), even when, in a period of time from a time when the control portion 110 controls the operation panel 7 to display the notification screen 210 to a time when the operation panel 7 accepts a completion instruction to complete paper sheet setting (a touch operation with respect to the completion key 222 on the selection screen 220), another one of the paper sheet cassettes 20 is drawn out from inside the apparatus, the control portion 110 does not perform control so that the notification screen 210 is newly displayed. That is, even in a case where, when any one of the notification screen 210, the selection screen 220 (see FIG. 7), and the setting screen (see FIG. 8 to FIG. 12) is being displayed, another one of the paper sheet cassettes 20 is drawn out from inside the apparatus, the notification screen 210 is not newly displayed.

(A Flow of a Process in a Case Where Paper Sheet Setting Is Accepted When the Paper Sheet Cassette Has Been Housed)

Figure 13:
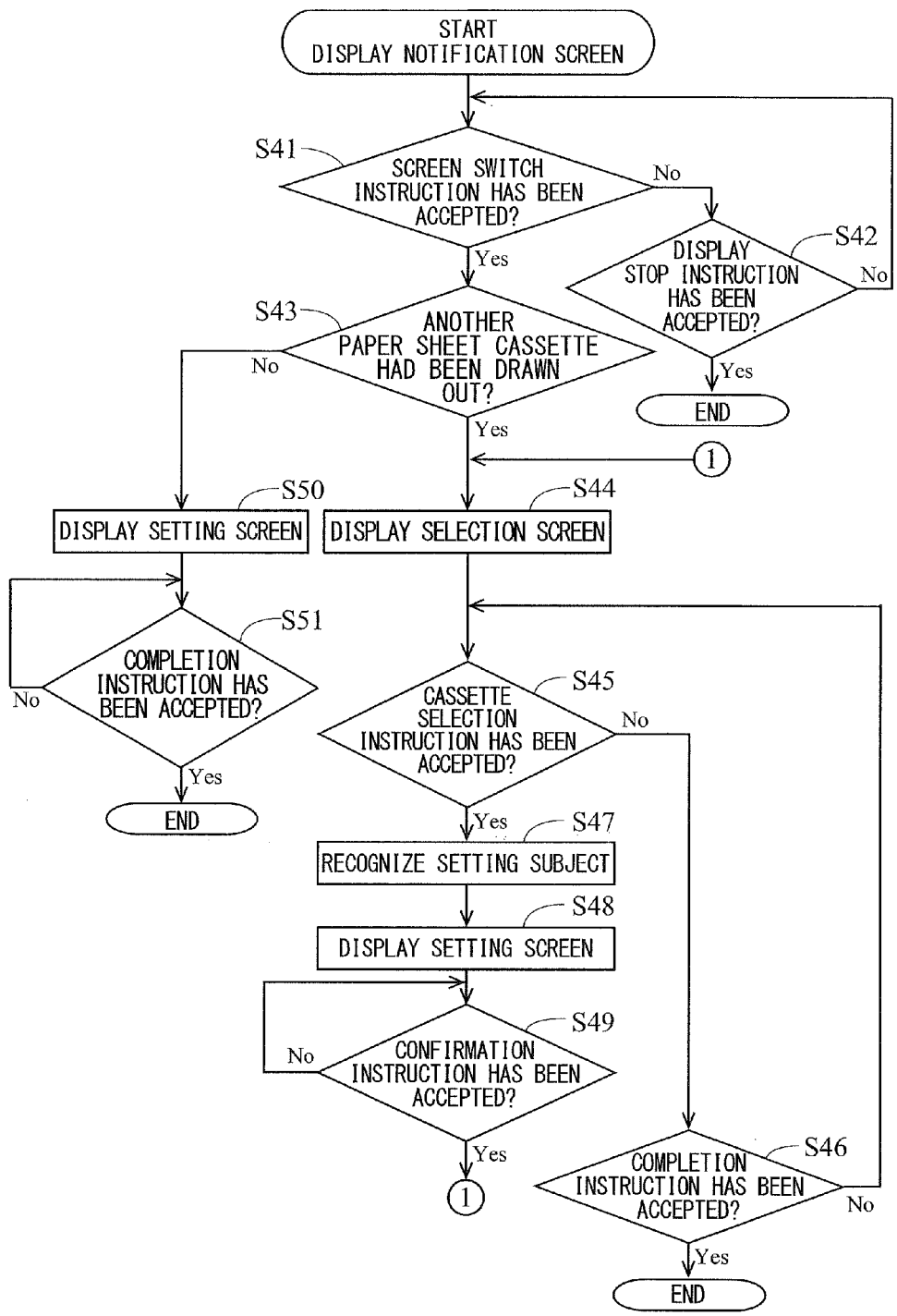
FIG. 13 is a flow chart for explaining a flow of an acceptance process of accepting paper sheet setting that is performed when, in the image forming apparatus according to the one embodiment of the present disclosure, a paper sheet cassette has been housed in the apparatus.

With reference to a flow chart shown in FIG. 13, a description is given of a flow of a process in a case where paper sheet setting is accepted when any one of the plurality of the paper sheet cassettes 20 has been housed in the image forming apparatus 100.

The flow chart shown in FIG. 13 is started upon the control portion 110 detecting an operation (reference operation) of housing any one of the plurality of the paper sheet cassettes 20 in the image forming apparatus 100 and display of the notification screen 210 by the operation panel 7 being started. That is, when, in a time period that is not a time period in which a printing job is executed nor a time period in which the printing job is discontinued, one of the paper sheet cassettes 20 which satisfies the second condition has been housed in the apparatus, the flow chart shown in FIG. 13 is started.

At Step S41, the control portion 110 judges whether or not the operation panel 7 has accepted a screen switch instruction (a touch operation with respect to the screen switch key 211 on the notification screen 210). In a case where, as a result thereof, the control portion 110 judges that the screen switch instruction has not been accepted, a transition is made to Step S42.

Upon the transition to Step S42, the control portion 110 judges whether or not the operation panel 7 has accepted a display stop instruction (a touch operation with respect to the OK key 212 on the notification screen 210). In a case where, as a result thereof, the control portion 110 judges that the display stop instruction has been accepted, the display of the notification screen 210 is stopped to complete this flow. On the other hand, in a case where the control portion 110 judges that the display stop instruction has not been accepted, the judgment at Step S41 is repeatedly performed.

In a case where, at Step S41, the control portion 110 judges that the screen switch instruction (the touch operation with respect to the screen switch key 211 on the notification screen 210) has been accepted, a transition is made to Step S43. Upon the transition to Step S43, the control portion 110 judges whether or not, in a time period between a time when, upon any one of the plurality of the paper sheet cassettes 20 being housed in the apparatus, the control portion 110 controlled the operation panel 7 to display the notification screen 210 (see FIG. 6) and a time when the operation panel 7 accepted the screen switch instruction (the touch operation with respect to the screen switch key 211 on the notification screen 210), another one of the paper sheet cassettes 20 had been drawn out from inside the apparatus.

In a case where, as a result of the judgment at Step S43, it is found that the another one of the paper sheet cassettes 20 had been drawn out, a transition is made to Step S44. On the other hand, in a case where it is found that the another one of the paper sheet cassettes 20 had not been drawn out, a transition is made to Step S50.

A configuration may also be adopted in which only in a case where, in the above-described time period, two or more of the paper sheet cassettes 20 which satisfy the second condition (those ones of the paper sheet cassettes 20 which, immediately before being drawn out, had paper sheet remaining quantities higher than the threshold value) had been drawn out from inside the apparatus, a transition is made to Step S44. That is, a configuration may be adopted in which in a case where, in the above-described time period, two or more of the paper sheet cassettes 20 had been drawn out from inside the apparatus, but only one of them satisfies the second condition, a transition is made to Step S50.

Here, processes at Steps S44 to S49 in the flow chart shown in FIG. 13 are the same as the processes at Steps S24 to S29 in the flow chart shown in FIG. 5. Descriptions of the processes at Steps S44 to S49 in the flow chart shown in FIG. 13 are, therefore, omitted by referring to the descriptions of the processes at Steps S24 to S29 in the flow chart shown in FIG. 5.

Upon the transition from Step S43 to Step S50, the control portion 110 recognizes, as a setting subject of paper sheet setting, one of the plurality of the paper sheet cassettes 20 which has most recently been housed in the apparatus and controls the operation panel 7 to display the setting screen 230 (see FIG. 8 to FIG. 12) corresponding to the one of the paper sheet cassettes 20 as the setting subject. Further, upon displaying the setting screen 230, the operation panel 7 switches a display screen in accordance with an operation performed with respect to the setting screen 230 and accepts various types of paper sheet setting. In this case, the selection screen 220 (see FIG. 7) is not displayed.

Subsequently, at Step S51, the control portion 110 judges whether or not the operation panel 7 has accepted a confirmation instruction (a touch operation with respect to the confirmation key 245 on the item screen 240). In a case where, as a result thereof, the control portion 110 judges that the confirmation instruction has been accepted, this flow is completed (paper sheet setting is completed). At this time, the control portion 110 controls the storage portion 113 to store, as paper sheet information, a content set on any of the detail setting screens 250 (see FIG. 9 to FIG. 12). That is, the selection screen 220 (see FIG. 7) is not displayed. Even in this case, however, a configuration may be adopted in which a confirmation instruction is received to display the selection screen 220, and a completion instruction to complete paper sheet setting is received to complete the paper sheet setting. On the other hand, in a case where the control portion 110 judges that the confirmation instruction has not been accepted, the judgment at Step S51 is repeatedly performed.

In a case of a configuration in which the fact that any one of the plurality of the paper sheet cassettes 20 has been housed in the apparatus is used as a trigger to display the notification screen 210 (see FIG. 6), even when, in a period of time from a time when the control portion 110 controls the operation panel 7 to display the notification screen 210 to a time when the operation panel 7 accepts a completion instruction to complete paper sheet setting (a touch operation with respect to the completion key 222 on the selection screen 220), another one of the paper sheet cassettes 20 is housed in the apparatus, the control portion 110 does not perform control so that the notification screen 210 is newly displayed. That is, even in a case where, when any one of the notification screen 210, the selection screen 220 (see FIG. 7), and the setting screen (see FIG. 8 to FIG. 12) is being displayed, another one of the paper sheet cassettes 20 is housed in the apparatus, the notification screen 210 is not newly displayed.

As described above, the image forming apparatus 100 of this embodiment has the printing portion 2 that prints an image on the paper sheet P, the paper sheet cassette 20 that is housed in the image forming apparatus 100 and, in a case of loading the paper sheet P therein, is drawn out from the image forming apparatus 100, the cassette sensor 23 that has an output varying depending on whether or not the paper sheet cassette 20 has been drawn out from the image forming apparatus 100, the control portion 110 that detects, based on an output of the cassette sensor 23, that the paper sheet cassette 20 has been drawn out from the image forming apparatus 100 and that the paper sheet cassette 20 has been housed in the image forming apparatus 100, and the operation panel 7 (operation display portion) that displays a screen related to paper sheet setting with respect to the paper sheet cassette 20 and accepts an operation. The control portion 110 detects, as a reference operation for judging whether or not to display the screen related to paper sheet setting, either an operation of drawing out the paper sheet cassette 20 from the image forming apparatus 100 or an operation of housing the paper sheet cassette 20 in the image forming apparatus 100. Further, when the reference operation has been performed in a time period other than while a printing job involving printing by the printing portion 2 is being executed, the control portion 110 controls the operation panel 7 to display the screen related to paper sheet setting, and when the reference operation has been performed while the printing job is being executed, the control portion 110 controls the operation panel 7 not to display the screen related to paper sheet setting.

In the configuration of this embodiment, when, in a time period other than while a printing job is being executed, the operation of drawing out the paper sheet cassette 20 from the image forming apparatus 100 or the operation of housing the paper sheet cassette 20 in the image forming apparatus 100 has been performed (in a case where there is a high possibility that paper sheet replacement work has been performed), the screen related to paper sheet setting is displayed. From a user's perspective, this provides convenience in that when paper sheet replacement work has been performed, it is no longer needed to perform separately an operation for displaying the screen related to paper sheet setting. Furthermore, in a case where the screen related to paper sheet setting is set to be displayed when the operation of drawing out the paper sheet cassette 20 from the image forming apparatus 100 or the operation of housing the paper sheet cassette 20 in the image forming apparatus 100 has been performed, such a configuration enables a user to be prompted to perform paper sheet setting, thus suppressing forgetting to perform paper sheet setting.

On the other hand, when, while a printing job is being executed, the operation of drawing out the paper sheet cassette 20 from the image forming apparatus 100 or the operation of housing the paper sheet cassette 20 in the image forming apparatus 100 has been performed (in a case where there is a high possibility that work of a type different from paper sheet replacement work, such as paper sheet replenishment work, has been performed), the screen related to paper sheet setting is not displayed. This can suppress a phenomenon in which, even though paper sheet replacement work has not been performed (there is no need to perform paper sheet setting), the screen related to paper sheet setting is unwantedly displayed. With no unwanted screen displayed, it is no longer needed to perform operations such as an operation of turning off such an unwanted screen, thus improving user's convenience (usability). Furthermore, this also prevents occurrence of an inconvenience that display of an unwanted screen confuses a user.

Furthermore, in this embodiment, as described above, when, even in a time period other than while a printing job is being executed, the reference operation has been performed in a time period in which the printing job is discontinued, the control portion 110 performs control so that the screen related to paper sheet setting is not displayed. Thus, even when, at the time of executing clearing of a paper jam, the operation of drawing out the paper sheet cassette 20 from the image forming apparatus 100 or the operation of housing the paper sheet cassette 20 in the image forming apparatus 100 is performed, in no case is the screen related to paper sheet setting unwantedly displayed.

Furthermore, in this embodiment, as described above, in a case where the operation of drawing out the paper sheet cassette 20 from the image forming apparatus 100 is detected as the reference operation, when, in a time period other than while a printing job is being executed, one of the paper sheet cassettes 20 which has a paper sheet remaining quantity higher than the threshold value has been drawn out, the control portion 110 performs control so that the screen related to paper sheet setting is displayed, and when, even in the time period other than while the printing job is being executed, one of the paper sheet cassettes 20 which has a paper sheet remaining quantity not higher than the threshold value has been drawn out, the control portion 110 performs control so that the screen related to paper sheet setting is not displayed. Furthermore, in a case where the operation of housing the paper sheet cassette 20 in the image forming apparatus 100 is detected as the reference operation, when, in a time period other than while a printing job is being executed, one of the paper sheet cassettes 20 which, before being drawn out from the image forming apparatus 100, had a paper sheet remaining quantity higher than the threshold value has been housed, the control portion 110 performs control so that the screen related to paper sheet setting is displayed, and when, even in the time period other than while the printing job is being executed, one of the paper sheet cassettes 20 which, before being drawn out from the image forming apparatus 100, had a paper sheet remaining quantity not higher than the threshold value has been housed, the control portion 110 performs control so that the screen related to paper sheet setting is not displayed. Thus, even when, at the time of executing work to replenish one of the paper sheet cassettes 20 whose paper sheet remaining quantity has become low with a batch of the paper sheets P, the operation of drawing out the paper sheet cassette 20 from the image forming apparatus 100 or the operation of housing the paper sheet cassette 20 in the image forming apparatus 100 is performed, in no case is the screen related to paper sheet setting unwantedly displayed.

Furthermore, in this embodiment, as described above, when the reference operation has been performed in a time period other than while a printing job is being executed, the control portion 110 performs control so that the notification screen 210 is displayed. This can reliably suppress forgetting to perform paper sheet setting. Furthermore, displaying the notification screen 210 first enables a user to recognize a reason for displaying a screen to which a transition can be made from the notification screen 210 (the selection screen 220 or the setting screen 230), and thus when a display screen is switched from the notification screen 210 to the selection screen 220, in no case does the user get confused (at this point in time, the user has recognized the need for paper sheet setting).

Furthermore, in this embodiment, as described above, when the screen switch key 211 provided in the screen of the notification screen 210 is operated, the control portion 110 performs control so that a display screen is switched from the notification screen 210 to the selection screen 220, and when any one of the plurality of selection keys 221 is operated, the control portion 110 performs control so that the setting screen 230 of one of the paper sheet cassettes 20 which corresponds to said operated one of the selection keys 221. Thus, when one of the plurality of selection keys 221 provided in the screen of the selection screen 220 is operated, which corresponds to one of the paper sheet cassettes 20 with respect to which replacement of the paper sheets P has been performed, only the setting screen 230 of the one of the paper sheet cassettes 20 (the one of the paper sheet cassettes 20 with respect to which replacement of the paper sheets P has been performed) which corresponds to said operated one of the selection keys 221 is displayed to enable paper sheet setting. At this time, an unwanted setting screen 230 (the setting screen 230 of one of the paper sheet cassettes 20 with respect to which no replacement of the paper sheets P has been performed) is not displayed, so that it is no longer needed to perform operations such as an operation of turning off the unwanted setting screen 230, thus improving user's convenience (usability). Also, there occurs no inconvenience that display of the unwanted setting screen 230 confuses a user.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. An image forming apparatus, comprising:
   a control portion that is formed of a CPU;
   a printing portion that prints an image on a paper sheet;
   a paper sheet cassette that is housed in the image forming apparatus and, in a case of loading a paper sheet therein, is drawn out from the image forming apparatus;
   a cassette sensor that has an output varying depending on whether or not the paper sheet cassette has been drawn out from the image forming apparatus; and
   an operation display portion that displays a screen related to paper sheet setting with respect to the paper sheet cassette and accepts an operation,
   wherein
   based on an output of the cassette sensor, the control portion detects that the paper sheet cassette has been drawn out from the image forming apparatus and that the paper sheet cassette has been housed in the image forming apparatus, and upon detecting either that the paper sheet cassette has been drawn out from the image forming apparatus or that the paper sheet cassette has been housed in the image forming apparatus, detects that a reference operation for judging whether or not to display the screen related to paper sheet setting has been performed, and
   when the reference operation has been performed in a time period other than while a printing job involving printing by the printing portion is being executed, the control portion controls the operation display portion to display the screen related to paper sheet setting, and when the reference operation has been performed while the printing job is being executed, the control portion controls the operation display portion not to display the screen related to paper sheet setting, the image forming apparatus further comprises a paper sheet remaining quantity sensor for detecting a paper sheet remaining quantity of the paper sheet cassette, based on an output of the paper sheet remaining quantity sensor, the control portion detects the paper sheet remaining quantity of the paper sheet cassette, in a case where an operation of drawing out the paper sheet cassette from the image forming apparatus is detected as the reference operation, when, in a time period other than while the printing job is being executed, as the paper sheet cassette, a paper sheet cassette having a paper sheet remaining quantity higher than a predetermined threshold value has been drawn out, the control portion performs control so that the screen related to paper sheet setting is displayed, and when, even in a time period other than while the printing job is being executed, as the paper sheet cassette, a paper sheet cassette having a paper sheet remaining quantity not higher than the threshold value has been drawn out, the control portion performs control so that the screen related to paper sheet setting is not displayed, and in a case where an operation of housing the paper sheet cassette in the image forming apparatus is detected as the reference operation, when, in a time period other than while the printing job is being executed, as the paper sheet cassette, a paper sheet cassette that, before being drawn out from the image forming apparatus, had a paper sheet remaining quantity higher than the threshold value has been housed, the control portion performs control so that the screen related to paper sheet setting is displayed, and when, even in a time period other than while the printing job is being executed, as the paper sheet cassette, a paper sheet cassette that, before being drawn out from the image forming apparatus, had a paper sheet remaining quantity not higher than the threshold value has been housed, the control portion performs control so that the screen related to paper sheet setting is not displayed.

2. The image forming apparatus according to claim 1, further comprising:

a paper sheet presence/absence sensor that is provided at a predetermined detection position in a paper sheet conveyance path along which a paper sheet is conveyed and has an output varying depending on presence/absence of a paper sheet at the detection position, wherein based on an output of the paper sheet presence/absence sensor, the control portion detects whether or not a paper jam has occurred, and upon detecting occurrence of the paper jam, the control portion performs control so that the printing job is discontinued, and when, even in a time period other than while the printing job is being executed, the reference operation has been performed in a time period in which the printing job is discontinued, the control portion performs control so that the screen related to paper sheet setting is not displayed.

3. The image forming apparatus according to claim 1, wherein as the screen related to paper sheet setting, the operation display portion displays a notification screen for prompting the paper sheet setting, when the reference operation has been performed in a time period other than while the printing job is being executed, the control portion performs control so that the notification screen is displayed, as the paper sheet cassette, a plurality of paper sheet cassettes are provided, as the screen related to paper sheet setting, the operation display portion displays a selection screen having a screen in which a plurality of selection keys corresponding to the plurality of paper sheet cassettes, respectively, are provided and a setting screen for accepting the paper sheet setting, when a screen switch key provided in a screen of the notification screen is operated, the control portion performs control so that a display screen is switched from the notification screen to the selection screen, and when any one of the plurality of selection keys is operated, the control portion performs control so that the setting screen of one of the paper sheet cassettes which corresponds to said operated one of the selection keys is displayed, and when among the paper sheet cassettes, a number of paper sheet cassettes that have been drawn out from the image forming apparatus and have paper sheet remaining quantities higher than the threshold value is plural, the control portion performs control so that the selection screen is displayed, and when among the paper sheet cassettes, the number of paper sheet cassettes that have been drawn out from the image forming apparatus and have paper sheet remaining quantities higher than the threshold value is not plural, the control portion performs control so that the setting screen is displayed without the selection screen displayed.

4. The image forming apparatus according to claim 1, wherein as the screen related to paper sheet setting, the operation display portion displays a notification screen for prompting the paper sheet setting, and when the reference operation has been performed in a time period other than while the printing job is being executed, the control portion performs control so that the notification screen is displayed.

5. The image forming apparatus according to claim 4, wherein as the paper sheet cassette, a plurality of paper sheet cassettes are provided, as the screen related to paper sheet setting, the operation display portion displays a selection screen having a screen in which a plurality of selection keys corresponding to the plurality of paper sheet cassettes, respectively, are provided and a setting screen for accepting the paper sheet setting, and when a screen switch key provided in a screen of the notification screen is operated, the control portion performs control so that a display screen is switched from the notification screen to the selection screen, and when any one of the plurality of selection keys is operated, the control portion performs control so that the setting screen of one the paper sheet cassettes which corresponds to said operated one of the selection keys is displayed.

6. The image forming apparatus according to claim 5, wherein when among the paper sheet cassettes, a number of paper sheet cassettes that have been drawn out from the image forming apparatus is plural, the control portion performs control so that the selection screen is displayed, and when among the paper sheet cassettes, the number of paper sheet cassettes that have been drawn out from the image forming apparatus is not plural, the control portion performs control so that the setting screen is displayed without the selection screen displayed.

7. A method for controlling an image forming apparatus, comprising:

- detecting that a paper sheet cassette, which is housed in the image forming apparatus and, in a case of loading a paper sheet therein, is drawn out from the image forming apparatus, has been drawn out from the image forming apparatus and that the paper sheet cassette has been housed in the image forming apparatus;
- upon detecting either that the paper sheet cassette has been drawn out from the image forming apparatus or that the paper sheet cassette has been housed in the image forming apparatus, detecting that a reference operation for judging whether or not to display a screen related to paper sheet setting with respect to the paper sheet cassette has been performed;
- when the reference operation has been performed while a printing job is being executed, not displaying the screen related to paper sheet setting, and when the reference operation has been performed in a time period other than while the printing job is being executed, displaying the screen related to paper sheet setting,
- in a case where an operation of drawing out the paper sheet cassette from the image forming apparatus is detected as the reference operation, detecting a paper sheet remaining quantity of the paper sheet cassette and when, in a time period other than while the printing job is being executed, as the paper sheet cassette, a paper sheet cassette having a paper sheet remaining quantity higher than a predetermined threshold value has been drawn out, performing control so that the screen related to paper sheet setting is displayed, and
- when, even in a time period other than while the printing job is being executed, as the paper sheet cassette, a paper sheet cassette having a paper sheet remaining quantity not higher than the threshold value has been drawn out, performing control so that the screen related to paper sheet setting is not displayed, and
- in a case where an operation of housing the paper sheet cassette in the image forming apparatus is detected as the reference operation, detecting the paper sheet remaining quantity and
- when, in a time period other than while the printing job is being executed, as the paper sheet cassette, a paper sheet cassette that, before being drawn out from the image forming apparatus, had a paper sheet remaining quantity higher than the threshold value has been housed, performing control so that the screen related to paper sheet setting is displayed, and
- when, even in a time period other than while the printing job is being executed, as the paper sheet cassette, a paper sheet cassette that, before being drawn out from the image forming apparatus, had a paper sheet remaining quantity not higher than the threshold value has been housed, performing control so that the screen related to paper sheet setting is not displayed.

* * * * *